US009794217B2

United States Patent
Sun

(10) Patent No.: US 9,794,217 B2
(45) Date of Patent: *Oct. 17, 2017

(54) ATTENTION COMMANDS ENHANCEMENT

(71) Applicant: LG Electronics Inc., Seoul (KR)

(72) Inventor: Lihsiang Sun, San Diego, CA (US)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/055,171

(22) Filed: Feb. 26, 2016

(65) Prior Publication Data

US 2016/0182442 A1 Jun. 23, 2016

Related U.S. Application Data

(63) Continuation of application No. 14/721,718, filed on May 26, 2015, now Pat. No. 9,294,331, which is a
(Continued)

(51) Int. Cl.
H04L 29/12 (2006.01)
H04W 72/04 (2009.01)
(Continued)

(52) U.S. Cl.
CPC .... H04L 61/2007 (2013.01); H04L 29/06142 (2013.01); H04L 61/10 (2013.01);
(Continued)

(58) Field of Classification Search
CPC ............. H04L 61/2007; H04L 61/6086; H04L 61/06142; H04L 61/10; H04W 72/042;
(Continued)

(56) References Cited

U.S. PATENT DOCUMENTS 9,060,353 B2    6/2015   Sun
9,294,331 B2 *   3/2016   Sun ..................... H04W 76/027
(Continued)

FOREIGN PATENT DOCUMENTS

WO    WO 2010/034377 A1    4/2010

OTHER PUBLICATIONS

Nokia et al: "Dual-stack UE Should Establish Parallel Single-stack PDN Connections", 3GPP Draft; S2-102933_CR1630_23401_UE_Req_DS, 3rd Generation Partnership Project (3GPP), Mobile Competence Centre; 650, Route Des Lucioles; F-06921; Sophia-Antipolis Cedex; France, vol. SAWG2, No. Kyoto; 20100510, May 14, 2010 (May 14, 2010).*
(Continued)

Primary Examiner — Andrew Chriss
Assistant Examiner — Ellen Kirillova
(74) Attorney, Agent, or Firm — Birch, Stewart, Kolasch & Birch, LLP

(57) ABSTRACT

A method of performing a packet domain event report by a mobile termination (MT) of a user equipment (UE) to a terminal equipment (TE) of the UE; and the UE therefore are discussed. The method according to one embodiment includes receiving, by the MT from the TE, a context activation request for a first packet data protocol (PDP) type; attempting, by the MT, a context activation with the first PDP type; receiving, by the MT from a network, a second PDP type assigned by the network for the context activation instead of the first PDP type; and sending, by the MT to the TE, an event message including a reason parameter indicating why the context activation request for the first PDP type is not granted.

16 Claims, 5 Drawing Sheets

Related U.S. Application Data continuation of application No. 14/486,629, filed on Sep. 15, 2014, now Pat. No. 9,060,353, which is a continuation of application No. 13/248,212, filed on Sep. 29, 2011, now Pat. No. 8,855,052.

(60) Provisional application No. 61/389,157, filed on Oct. 1, 2010.

(51) Int. Cl.
*H04W 76/02* (2009.01)
*H04L 29/06* (2006.01)
*H04W 88/04* (2009.01)

(52) U.S. Cl.
CPC ....... *H04L 61/6086* (2013.01); *H04W 72/042* (2013.01); *H04W 72/0406* (2013.01); *H04W 72/0413* (2013.01); *H04W 76/027* (2013.01); *H04W 88/04* (2013.01)

(58) Field of Classification Search
CPC ........... H04W 76/027; H04W 72/0406; H04W 72/0413
USPC .......................................................... 370/328
See application file for complete search history.

(56) References Cited

U.S. PATENT DOCUMENTS

| | | | |
|---|---|---|---|
| 2002/0087701 A1* | 7/2002 | Siikaniemi | H04W 76/064 |
| | | | 709/227 |
| 2003/0198198 A1 | 10/2003 | Echavarri et al. | |
| 2005/0152401 A1* | 7/2005 | Wiljakka | H04W 8/26 |
| | | | 370/474 |
| 2007/0058545 A1 | 3/2007 | Nookala et al. | |
| 2007/0291670 A1* | 12/2007 | Pettersson | H04W 76/022 |
| | | | 370/310 |
| 2008/0101276 A1 | 5/2008 | Huang et al. | |
| 2008/0244102 A1 | 10/2008 | Mochizuki | |
| 2011/0072313 A1 | 3/2011 | Fuhrmann et al. | |
| 2011/0130157 A1 | 6/2011 | Griot et al. | |
| 2011/0171953 A1 | 7/2011 | Faccin et al. | |
| 2011/0185250 A1* | 7/2011 | Huang | H04L 61/2007 |
| | | | 714/749 |

OTHER PUBLICATIONS

Vodafone: "Enabling dual stack PDP contexts for Gn/Gp SGSNs and GGSNs", 3GPP Draft; S2-093934 CR 23060-900 GNGP PDP Type IPV4V6-R1, 3rd Generation Partnership Project (3GPP), Mobile Competence Centre; 650, Route Des Lucioles; F-06921 Sophia-Antipolis Cedex; France, No. Tallinn; 20090514, May 14, 2009 (May 14, 2009).*

St-Ericsson et al: "Alignment of table headers with AT-command names", 3GPP Draft; C1-102749-Table-Fixes-V6, 3rd Generation Partnership Project (3GPP), Mobile Competence Centre; 650, Route Des Lucioles; F06921 Sophia-Antipolis Cedex; France, vol. CT WG1, No. Dublin; 20100702, Jul. 5, 2010 (Jul. 5, 2010).*

Nokia et al., "Dual-stack UE Should Establish Parallel Single-stack PDN Connections", 3GPP TSG-SA WG2 Meeting #79 Kyoto, Japan, May 10-14, 2010, S2-102933, pp. 1-20

St-Ericsson et al., "Alignment of table headers with AT command names", 3GPP TSG-CT WG1 Meeting #65 Dublin (Ireland), Jun. 28-Jul. 2, 2010, C1-102749, pp. 1-32.

Vodafone. "Enabling dual stack PDP contexts for Gn/Gp SGSNs and GGSNs", 3GPP Tsg-SA2 Meeting #73 Tallinn, Estonia, May 11-15, 2009. 52-093934, pp. 1-12.

* cited by examiner

| Command | Possible response(s) |
|---|---|
| +CGEREP=[<mode>[,<bfr>]] | OK<br><br>ERROR |
| +CGEREP? | +CGEREP: <mode>,<bfr> |
| +CGEREP=? | +CGEREP: (list of supported <mode>s), (list of supported <bfr>s) |

ATTENTION COMMANDS ENHANCEMENT

CROSS-REFERENCE TO RELATED APPLICATIONS

This application is a continuation of copending U.S. application Ser. No. 14/721,718 filed on May 26, 2015, which is a continuation of U.S. application Ser. No. 14/486,629 filed on Sep. 15, 2014 (now U.S. Pat. No. 9,060,353), which is a continuation of U.S. application Ser. No. 13/248,212, filed on Sep. 29, 2011 (now U.S. Pat. No. 8,855,052), which claims the benefit under 35 U.S.C. §119(e) to U.S. Provisional Application No. 61/389,157, filed on Oct. 1, 2010. The contents of all of these applications are hereby incorporated by reference as fully set forth herein in their entirety.

BACKGROUND OF THE INVENTION

Field of the Invention

The present invention relates to PDP context activation and/or PDN connection for providing a scheme by providing a reason as to why only a single IP address is assigned for the PDP context activation or the PDN connection activation, the capability of the Mobile Termination for autonomously requesting a second address bearer, and the result of the second address bearer activation.

Description of the Related Art

In the related art, certain methods related to PDP context activation and/or PDN connection activation were problematic due to the user equipment (UE) being split into a Mobile Termination (MT) and Terminal Equipment (TE). As such, the related art technologies do not sufficiently address such issues, and thus do not offer appropriate solutions.

SUMMARY OF THE INVENTION

Accordingly, an object of the present invention is to more efficiently and effectively perform PDP context activation and/or PDN connection activation. In particular, the embodiments in the present disclosure provide a scheme by providing a reason as to why only a single IP address is assigned for the PDP context activation or the PDN connection activation, the capability of the Mobile Termination for autonomously requesting a second address bearer, and the result of the second address bearer activation.

DETAILED DESCRIPTION OF THE INVENTION

The inventive concepts and features herein are generally explained in terms of the 3GPP technical standard. However, such details are not meant to limit the various features described herein, which are applicable to other types of mobile and/or wireless (radio) communication systems and methods.

Figure 1:
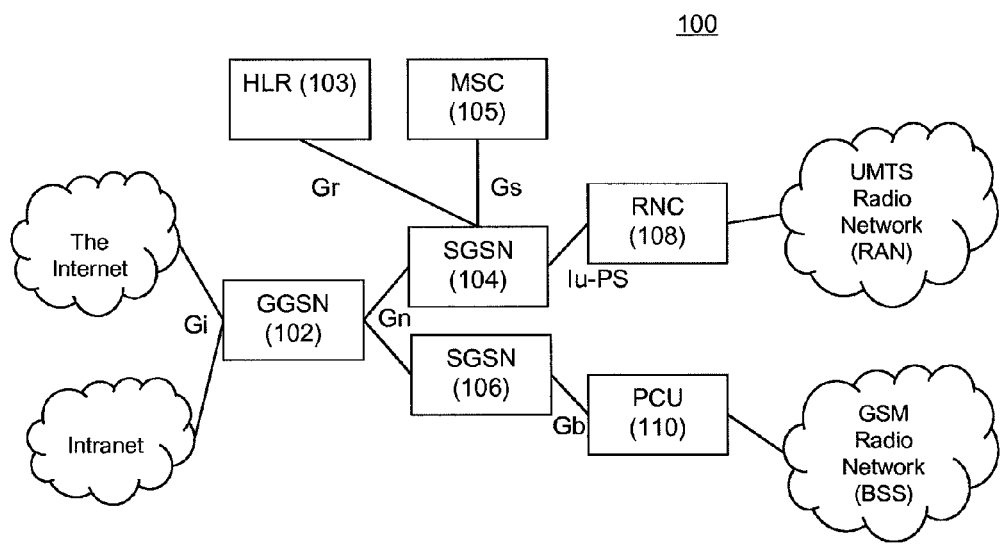
FIG. 1 shows a conceptual diagram of a network architecture including a General Packet Radio Service (GPRS) core network.

FIG. 1 shows a conceptual diagram of a network architecture including a General Packet Radio Service (GPRS) core network 100, which is the central part of the GPRS that allows 2G, 3G and Wideband Code Division Multiple Access (WCDMA) mobile networks to transmit Internet Protocol (IP) packets to external networks such as the Internet. The GPRS core network 100 provides mobility management, session management and transport for IP packet services in Global System for Mobile communications (GSM) networks, WCDMA networks, and the like. The GPRS core network also provides support for other additional functions such as billing, subscriber authentication and authorization, and the like. As with GSM in general, GPRS is an open standards driven system, and the standardization body is the 3GPP. The GPRS system is an integrated part of the GSM network switching subsystem, which is based on technical standards developed by the European Telecommunications Standards Institute (ETSI). The GSM standard is succeeded by the 3G Universal Mobile Telecommunications System (UMTS) standard, which is further evolving to the 4G Long-Term Evolution (LTE) Advanced standard.

Referring back to FIG. 1, the GPRS core network 100 includes a Gateway GPRS Support Node (GGSN) 102 connected to the Internet and one or more Intranets via the Gi interface, which is an IP-based interface. One or more Serving GPRS Support Node (SGSNs) 104, 106 are connected to the GGSN 102 via the Gn interface, which is an IP-based interface. Each SGSN 104 is connected with an HLR 103 via the Gr interface (that supports messages of MAP3 protocol), and an MSC 105 via the Gs interface (that allows paging and station availability when performing data transfer). Also, the SGSN 104 is connected with an RMC 108 via the Iu-PS interface (that supports the Packet Switched domain), and the SGSN 106 is connected to a PCY 110 via the Gb interface (that uses the Frame Relay or IP transmission protocol). The RNC 108 is connected with the UMTS radio network (RAN), and the PCU 110 is connected with the GSN radio network (BSS).

The General Packet Radio Service (GPRS) tunneling protocol, i.e. GTP, is the basic Internet protocol used for the GPRS core network. GTP allows end users of a GSM or WCDMA network to move (or roam) from place to place while continuing to connect to the Internet (or other network) at the GGSN. This is achieved by carrying the subscriber's data from the subscriber's current Serving GSN to the GGSN which is handling the subscriber's session. Three forms of GTP are used by the GPRS core network: GTP-U (for transfer of user data in separated tunnels for each PDP context, which will be described hereafter), GTP-C (for providing control procedures to setup and delete PDP contexts, verify GSN availability, and provide updates), and GTP' (for transferring billing or charging data from GSNs to a charging function).

The packet data protocol (PDP) context is a data structure that exists for both the Serving GPRS Support Node (SGSN) and the Gateway GPRS Support Node (GGSN), which contains the subscriber's session information when the subscriber has an active session. When a mobile terminal wants to use GPRS, it must first attach with the network and then activate a PDP context. Doing so allocates a PDP context data structure in the SGSN that the subscriber is currently visiting, and the GGSN serving the subscriber's access point. The data recorded includes: the subscriber's IP address, the subscriber's IMSI, and the subscriber's Tunnel Endpoint ID (TEID) at the GGSN and at the SGSN. The TEID is a number allocated by the GSN, which identifies the tunnelled data related to a particular PDP context. Several PDP contexts may use the same IP address. A so-called Secondary PDP Context Activation procedure may be used to activate a PDP context while reusing the PDP address and other PDP context information from an already active PDP context, but with a different QoS profile. Such procedure is called secondary, because it does not use the resulting PDP contexts that have no such relationship with the one the PDP address of which they reused. A total of 11 PDP contexts (with any combination of primary and secondary) can co-exist. A Network Service Access Point Identifier (NSAPI) can be used to differentiate among the different PDP contexts.

Figure 2:
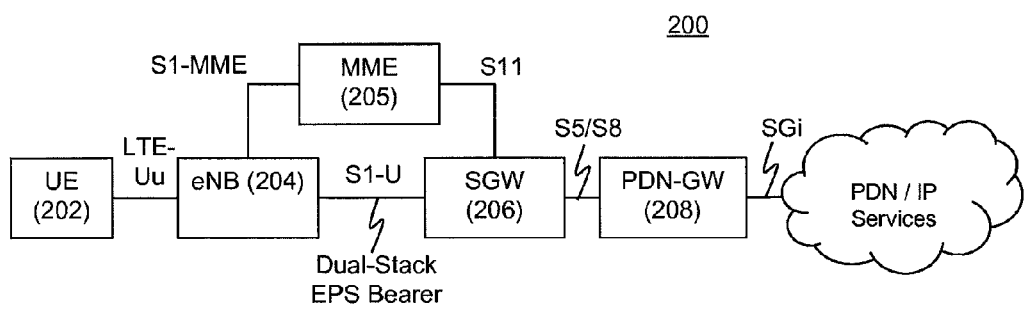
FIG. 2 shows a conceptual diagram of a basic evolved packet system architecture for a 3GPP Evolved Packet System (EPS) that supports Long-Term Evolution. (LTE).

FIG. 2 shows a conceptual diagram of a basic evolved packet system architecture for a 3GPP Evolved Packet System (EPS) that supports Long-Term Evolution (LTE).

The UE 202 (user equipment or other type of subscriber terminal) connects with a network (that includes an E-UTRAN) via an eNB 204 (evolved Node B). The eNB is connected with a SGW 206 (Service Gateway) via the S1-U interface. Here, it should be noted that a dual-stack EPS bearer (to be explained later) can be established between the UE and the PDN-GW. The eNB and the SGW is connected together via an MME 205 (Mobility Management Entity), whereby the eNB and the MME are connected via an S1-MME interface, and the SGW and the MME are connected via an S11 interface. The SGW is connected to a PDN-GW 208 via an S5/S8 interface. The PDN-GW (Public Data Network Gateway) is connected to the PDN/IP Services network via the SGi interface.

Figure 3:
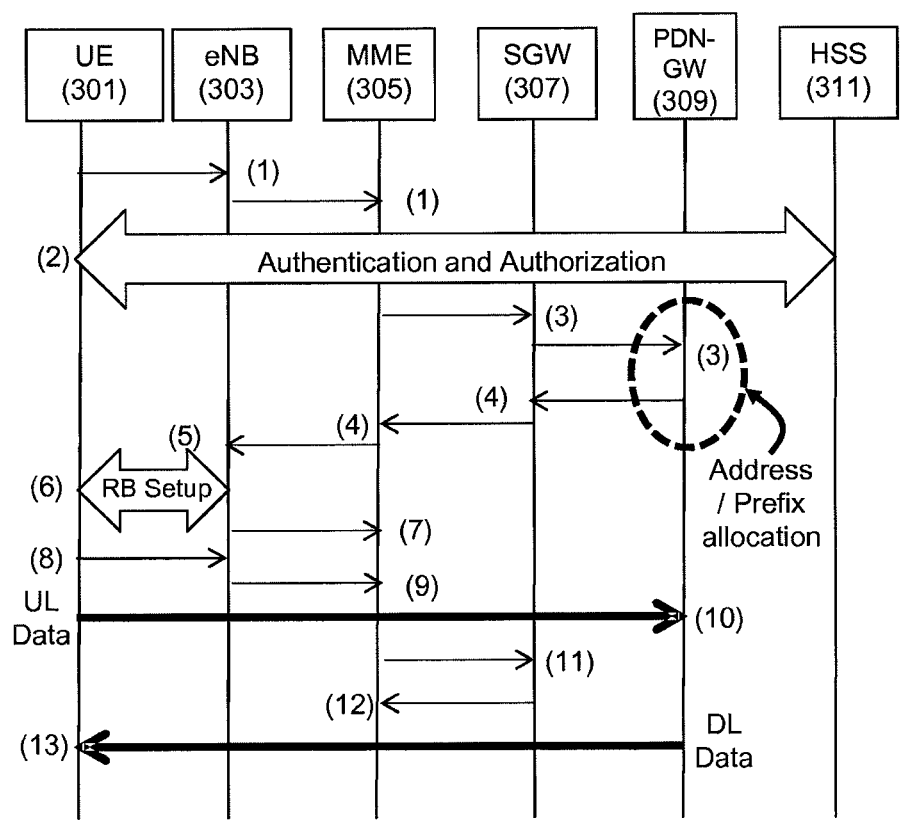
FIG. 3 shows a conceptual basic signal flow diagram for PDN connection establishment.

FIG. 3 shows a conceptual basic signal flow diagram for PDN connection establishment during the attach procedure. In step (1), the attach request procedure is performed by the UE 301 sending an attach request message to the MME 305 via the eNB 303. The attach request message further contains a PDN connectivity request message indicating the PDN type (IP versions) requested by the UE. The PDN connectivity request may optionally include an Access Point Name (APN). If the APN is not included, the message indicates that the APN is either not included (i.e. to use a default APN), or the APN will be sent to the MME 305 in a separate message, as part of step (2), after ciphering and integrity protection are enabled. In step (2), the authentication and authorization phase is performed between the UE 301 and the HSS 311 via various network entities. The HSS (311) sends the subscription data to the MME (305), if the UE is authenticated to use the EPS service. In step (3), the MME 305 creates a session request that is sent to the PDN-GW 309 via the SGW 307. In step (4), the PDN-GW 309 creates session response that is sent to the eNB 303 via the MME 305. In step (5), the initial context setup request/attach accept procedures are performed between the eNB 303 and the MME 305. Then, in step (6), radio bearer configuration is performed between the UE 301 and the eNB 303.

Thereafter, in step (7), the eNB 303 sends an initial context setup response message to the MME 305. In step (8), a direct transfer message containing an attach complete message from the UE 301 is sent to the eNB 303, which then sends the attach complete message to the MME 305 in step (9).

Thus, the UE 301 can start sending UL data to the PDN-GW 309 in step (10). In step (11), the MME 305 can send a modify bearer request to eh SGW 307, when can send a modify bearer response in response thereto in step (12). The PDN-GW 309 can start sending DL data to the UE in step (13).

Here, it should be noted that in part of step (3) being performed at the PDN-GW 309, the procedures for address/prefix allocation are performed.

A Public Data Network (PDN) connection (i.e. an IP connection) refers to an association between the UE and a PDN. Such association can be represented by one IPv4 address and/or one /64 IPv6 prefix, which will be described in more detail later. The PDN is responsible for IP address/prefix management. The PDN is identified by an APN (Access Point Name) and the PDN is accessed via a PDN-GW (Gateway). The UEs and the network use Access Point Names (APNs) for identification of the network and for providing some information about the services related to that network.

It should be noted that the above explanations regarding the 3GPP Evolved Packet System (EPS) and the PDN connection are based on the 3GPP Release 8 (Rel-8) technical specification. For pre-Release 8 systems, the Primary PDP context used in GPRS (and described previously with respect to FIG. 1) is basically equivalent to the PDN connection of the Release 8 system.

A more detailed explanation of the dual-stack EPS bearer (that is shown between the UE 202 and the PDN-GW 208 as shown in FIG. 2) will now be provided hereafter. The logical concept of a bearer refers to an aggregate of one or more IP signal (or data) flows related to one or more IP-related services. The Evolved Packet System (EPS) bearer established between the UE and the PDN-GW is used for transporting IPv4 and/or IPv6 packets. During the setup or establishment of such bearer(s), the Access Point Names (APNs) are used to find and connect with the gateway(s) (such as the GGSN 102 in FIG. 1, the PDN-GW 208 in FIG. 2, etc.). The APN together with the subscription data from HSS, and the PDN type requested by the UE, provide the necessary information related to IP connectivity, the protocols to be used, and the like. When the UE 202 requests a PDN connection, the MME 205 uses a default APN for that UE or the full domain name of that APN and performs the appropriate procedures and IP addressing after bearer setup.

With respect to IP addressing, Internet Protocols (such as IPv4 and IPv6) support packet-switched networking to provide data transmissions across multiple IP networks. Each data packet routed across one or more networks contains two numerical addresses respectively specifying the source device and the destination device. Internet Protocol version 4 (IPv4) is the current foundation for most Internet connections, but due to the growth of IP packet communications, a greater number addresses are required, and thus Internet Protocol version 6 (IPv6) was developed. IPv4 employs 32 bits for an IP address, while IPv6 employs 128 bits. IPv6 has additional advantages with respect to security, privacy, and authentication. A PDN type is assigned to the UE through steps (4)~(6) of FIG. 3. If the PDN type of the PDN connection is IPv4 or IPv6 (i.e. a single stack bearer), one IP address of the PDN type will be assigned to the UE. If the PDN type of the PDN connection is IPv4v6 (i.e. a dual-stack bearer), one IPv4 address and one IPv6 address will be assigned to the UE. A so-called IPv4/IPv6 dual-protocol stack (i.e. dual-stack) bearer enables devices and applications to use or automatically select the desired protocol according to address type requested by the application, using a single PDN connection, instead of using one PDN connection for IPv4 and another for IPv6.

As a result, the EPS bearer has three types: an IPv4 only bearer, an IPv6 only bearer, and an IPv4v6 bearer. The IPv4 only bearer is configured with one IPv4 address, the IPv6 only bearer is configured with one /64 prefix together with an interface identifier, and the IPv4v6 bearer is configured with both an IPv4 address and one /64 prefix and an interface identifier. The EPS bearer of the IPv4v6 type is a "dual-stack" bearer, because both the IPv4 protocols and IPv6 protocols are supported in a single PDN connection.

The dual-stack approach for IP connectivity is different for systems prior to Release 8, and for systems supporting Release 8 and beyond. For networks supporting both IP versions prior to Release 8, two parallel PDP contexts, one of IPv4 type and one of IPv6 type, are employed. For networks supporting both IP versions from Release 8 and beyond, the network can allocate the UE (a) a single IPv4v6 PDN, or the network can allocate the UE (b) an IPv4 PDN connection and an IPv6 PDN connection. The case (b) may be employed by a release 8 and beyond network which supports both IP versions, but chooses to allocate two PDN connections for each address type separately, because the UE may be handed off to a pre-release 8 network which does not support the PDN connections of type IPv4v6. For the network preferring behavior (b), the request with PDN type IPv4v6 is granted by assigning a single-stack PDN connection, (e.g. with PDN type IPv4), and by signaling a cause code indicating that network supports single address bearers only. The UE received the cause code, should request a separate PDN connection of a second address type (e.g. IPv6).

When a primary (or initial) PDP context or a PDN connection is activated (or established) between the UE and the network, only a single IP address is assigned, despite the request for IPv4v6 addressing.

One reason for this may be because that network only supports one type of IP address, or that the network can only support a single address bearer only (either IPv4 only or and IPv6 on separate PDN connections only,) instead of PDN type IPv4v6, as shown in the previously-described case (b). This network limitation is conveyed in the reason code in step (5) and (6) in FIG. 3.

For the case that the UE is split to a Mobile Termination (MT: such as a modem or other type of transceiver) and Terminal Equipment (TE: such as a computer of other device with processing functions), although MT is aware of the reason for the single address bearer allocation from the network, the TE would not know this fact. For the case that network supports single address bearer only, (1) the TE may erroneously interpret that only one address assigned is because the network does not support the other address type, and gives up on requesting another address type bearer, and (2) the MT and TE do not know who should activate the PDP context/PDN connection of the 2nd address type. This causes the MT and the TE to wait for each other, or results in the MT and the TE both trying to activate the PDP context/PDN connection.

Thus, the present inventor recognized that such conventional techniques for PDP context activation or PDN connection activation for a split UE could be improved. As a result, it was found that providing a reason as to why only a single IP address is assigned for the PDP context activation or the PDN connection activation would be advantageous to ensure proper signal processing. In particular, the concept of adding a reason code (and optionally a MT allocated <cid>) into the +CGEV event (which will be described in detail hereafter) has never been provided or suggested in any known method prior to the work done by the present inventor as described in this disclosure and in the priority document disclosures.

To better understand and to implement the technical solution conceived by the present inventor, some details about the command syntax for various parameters and actions with respect to certain commands for the packet domain in the AT command set for User Equipment (UE) need to be considered.

Attention (AT) commands are used for controlling Mobile Termination (MT) functions and GSM/UMTS/LTE network services from a Terminal Equipment (TE) such as a computer (equal to DTE: Data Terminal Equipment) through a Terminal Adaptor (TA) such as a data card (equal to DCE: Data Circuit terminating Equipment). Some AT commands are defined such way that they can be easily applied to Mobile Termination (MT) of networks other than GSM/UMTS/LTE.

Figures 4, 5:
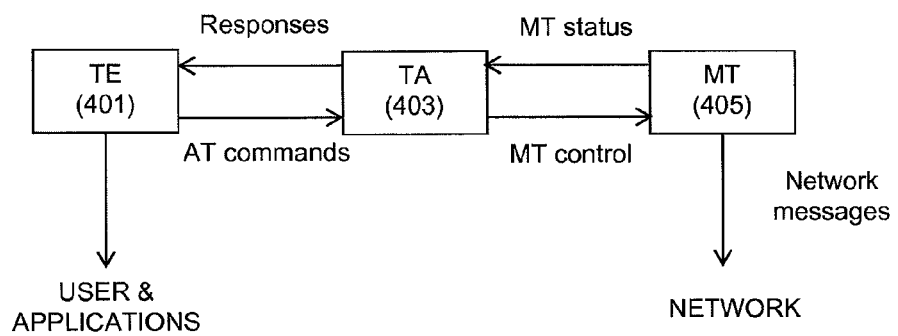
FIG. 4 shows an abstract architecture comprising Terminal Equipment (TE) and Mobile Termination (MT) interfaced by a Terminal Adaptor (TA).
FIG. 5 shows a table for +CGEREP parameter command syntax.

FIG. 4 shows that such AT commands assumes an abstract architecture comprising a TE (e.g. a computer) and a MT interfaced by a TA. The TE 401, which performs various actions for the user and applications, may send AT commands to the TA 403 that can send responses thereto back to the TE 401. The TA 403 may send MT control messages to the MT 405, which can return MT status messages back to the TA 403. The MT 405 also sends network messages to the one or more networks.

This abstract architecture can be physically implemented in various ways: (1) TA, MT and TE as three separate entities; (2) TA integrated under the MT cover, and the TE implemented as a separate entity; (3) TA integrated under the TE cover, and the MT implemented as a separate entity; and (4) TA and MT integrated under the TE cover as a single entity.

The AT commands (e.g. GSM/UMTS commands) use certain syntax rules. Standardized basic commands are found only in ITU-T Recommendation V.250. GSM/UMTS commands use syntax rules of extended commands. Every extended command has a test command to test the existence of the command and to give information about the type of its sub-parameters. Parameter type commands also have a read command to check the current values of sub-parameters. Action type commands do not store the values of any of their possible sub-parameters, and therefore do not have a read command.

The AT commands include: (5.) General commands, (6.) Call control commands, (7.) Network service related commands, (8.) Mobile Termination (MT) control and status commands, (9.) Mobile termination errors result codes, (10.) Commands for Packet Domain, (11.) Commands for VGCS (Voice Group Call Service) and VBS (Voice Broadcast Service), and (12.) Commands for the USIM Application Toolkit.

The (10.) Commands for Packet Domain defines commands that a TE can use to control a MT supporting packet switched services.

Packet Domain MTs will vary widely in functionality. At one extreme, a MT supporting CS/PS or class-A mode of operation might support multiple PDP types as well as circuit switched data, and use multiple external networks and QoS (Quality of Service) profiles. At the other extreme a MT supporting only PS or class-C mode of operation might support only a single PDP type using a single external network, and rely on the HLR to contain the PDP context definition.

A comprehensive set of Packet Domain-specific commands provide the flexibility needed by the more complex MT. The commands are designed to be expandable to accommodate new PDP types and interface protocols, merely by defining new values for many of the parameters. Multiple contexts can be activated if the interface link-layer protocol is able to support them. The commands use the extended information and error message capabilities. For MTs of intermediate complexity, most commands have simplified forms where certain parameters can be omitted. For the simplest MTs, and for backwards compatibility with existing communications software, it is possible to control access to the Packet Domain using existing modem-compatible commands. A special dial-string syntax is defined for use with the D command.

Within (10.) Commands for Packet Domain, there are (10.1) Commands specific to MTs supporting the Packet Domain, and (10.2) Modem compatibility commands.

The (10.1) Commands specific to MTs supporting the Packet Domain include many specific commands, including (10.1.1) Define PDP Context command (+CGDCONT) and (10.1.2) Define Secondary PDP Context command (+CGDSCONT). However, among the (10.1) Commands specific to MTs supporting the Packet Domain, there is a (10.1.19) Packet Domain event reporting command (+CGEREP), which contain portions that the present inventor has improved upon.

FIG. 5 shows a table for +CGEREP parameter command syntax. An explanation of the description, the defined values, and the defined events, with respect to the +CGEREP parameter command syntax, will be provided hereafter.

Description

Set command enables or disables sending of unsolicited result codes, +CGEV: XXX from MT to TE in the case of certain events occurring in the Packet Domain MT or the network. <mode> controls the processing of unsolicited result codes specified within this command. <bfr> controls the effect on buffered codes when <mode> 1 or 2 is entered. If a setting is not supported by the MT, ERROR or +CME ERROR: is returned. Read command returns the current mode and buffer settings. Test command returns the modes and buffer settings supported by the MT as compound values.

Defined Values

<mode>: a numeric parameter 0 buffer unsolicited result codes in the MT; if MT result code buffer is full, the oldest ones can be discarded. No codes are forwarded to the TE.

1 discard unsolicited result codes when MT-TE link is reserved (e.g. in on-line data mode); otherwise forward them directly to the TE.

2 buffer unsolicited result codes in the MT when MT-TE link is reserved (e.g. in on-line data mode) and flush them to the TE when MT-TE link becomes available; otherwise forward them directly to the TE.

<bfr>: a numeric parameter

0 MT buffer of unsolicited result codes defined within this command is cleared when <mode> 1 or 2 is entered.

1 MT buffer of unsolicited result codes defined within this command is flushed to the TE when <mode> 1 or 2 is entered (OK response shall be given before flushing the codes).

Defined Events

The events are valid for GPRS/UMTS and LTE unless explicitly mentioned.

1) For network attachment, the following unsolicited result codes and the corresponding events are defined:

+CGEV: NW DETACH

The network has forced a PS detach. This implies that all active contexts have been deactivated. These are not reported separately.

+CGEV: ME DETACH

The mobile termination has forced a PS detach. This implies that all active contexts have been deactivated. These are not reported separately.

2) For MT class, the following unsolicited result codes and the corresponding events are defined:

+CGEV: NW CLASS <class>

The network has forced a change of MT class. The highest available class is reported (see +CGCLASS). The format of the parameter <class> is found in command +CGCLASS.

+CGEV: ME CLASS <class>

The mobile termination has forced a change of MT class. The highest available class is reported (see +CGCLASS). The format of the parameter <class> is found in command +CGCLASS.

3) For PDP context activation, the following unsolicited result codes and the corresponding events are defined:

+CGEV: NW PDN ACT <cid>

The network has activated a context. The context represents a Primary PDP context in GSM/UMTS. The <cid> for this context is provided to the TE. The format of the parameter <cid> is found in command +CGDCONT. (NOTE 1: This event is not applicable for EPS.)

+CGEV: ME PDN ACT <cid>

The mobile termination has activated a context. The context represents a PDN connection in LTE or a Primary PDP context in GSM/UMTS. The <cid> for this context is provided to the TE. This event is sent either in result of explicit context activation request (+CGACT), or in result of implicit context activation request associated to attach request (+CGATT=1). The format of the parameter <cid> is found in command +CGDCONT.

+CGEV: NW ACT <p_cid>, <cid>, <event_type>

The network has activated a context. The <cid> for this context is provided to the TE in addition to the associated primary <p_cid>. The format of the parameters <p_cid> and <cid> are found in command +CGDSCONT.

<event_type> integer type parameter indicates whether this is an informational event or whether the TE has to acknowledge it.

0 Informational event

1 Information request: Acknowledgement required. The acknowledgement can be accept or reject, see +CGANS.

+CGEV: ME ACT <p_cid>, <cid>, <event_type>

The network has responded to an ME initiated context activation. The <cid> for this context is provided to the TE in addition to the associated primary <p_cid>. The format of the parameters <p_cid> and <cid> are found in command +CGDSCONT. The format of the parameter <event_type> is defined above.

4) For PDP context deactivation, the following unsolicited result codes and the corresponding events are defined:

+CGEV: NW DEACT <PDP_type>, <PDP_addr>, [<cid>]

The network has forced a context deactivation. The <cid> that was used to activate the context is provided if known to the MT. The format of the parameters <PDP_type>, <PDP_addr> and <cid> are found in command +CGDCONT.

+CGEV: ME DEACT <PDP_type>, <PDP_addr>, [<cid>]

The mobile termination has forced a context deactivation. The <cid> that was used to activate the context is provided if known to the MT. The format of the parameters <PDP_type>, <PDP_addr> and <cid> are found in command +CGDCONT.

+CGEV: NW PDN DEACT <cid>

The network has deactivated a context. The context represents a PDN connection in LTE or a Primary PDP context in GSM/UMTS. The associated <cid> for this context is provided to the TE. The format of the parameter <cid> is found in command +CGDCONT. (NOTE 2: Occurrence of this event replaces usage of the event +CGEV: NW DEACT<PDP_type>, <PDP_addr>, [<cid>].)

+CGEV: ME PDN DEACT <cid>

The mobile termination has deactivated a context. The context represents a PDN connection in LTE or a Primary PDP context in GSM/UMTS. The <cid> for this context is provided to the TE. The format of the parameter <cid> is found in command +CGDCONT. (NOTE 3: Occurrence of this event replaces usage of the event +CGEV: ME DEACT <PDP_type>, <PDP_addr>, [<cid>].)

+CGEV: NW DEACT <p_cid>, <cid>, <event_type>

The network has deactivated a context. The <cid> for this context is provided to the TE in addition to the associated primary <p_cid>. The format of the parameters <p_cid> and <cid> are found in command +CGDSCONT. The format of the parameter <event_type> is defined above. (NOTE 4: Occurrence of this event replaces usage of the event +CGEV: NW DEACT <PDP_type>, <PDP_addr>, [<cid>].)

+CGEV: ME DEACT <p_cid>, <cid>, <event_type>

The network has responded to an ME initiated context deactivation request. The associated <cid> is provided to the TE in addition to the associated primary <p_cid>. The format of the parameters <p_cid> and <cid> are found in command +CGDSCONT. The format of the parameter <event_type> is defined above.

(NOTE 5: Occurrence of this event replaces usage of the event +CGEV: ME DEACT <PDP_type>, <PDP_addr>, [<cid>].)

5) For PDP context modification, the following unsolicited result codes and the corresponding events are defined:

+CGEV: NW MODIFY <cid>, <change_reason>, <event_type>

The network has modified a context. The associated <cid> is provided to the TE in addition to the <change_reason> and <event_type>. The format of the parameter <cid> is found in command +CGDCONT or +CGDSCONT. The format of the parameters <change_reason> and <event_type> are defined above.

<change_reason> integer type parameter indicates what kind of change occurred.

1 TFT only changed
2 Qos only changed
3 Both TFT and QoS changed

+CGEV: ME MODIFY <cid>, <change_reason>, <event_type>

The mobile termination has modified a context. The associated <cid> is provided to the TE in addition to the <change_reason> and <event_type>. The format of the parameter <cid> is found in command +CGDCONT or +CGDSCONT. The format of the parameters <change_reason> and <event_type> are defined above.

6) For other PDP context handling, the following unsolicited result codes and the corresponding events are defined:

+CGEV: REJECT <PDP_type>, <PDP_addr>

A network request for context activation occurred when the MT was unable to report it to the TE with a +CRING unsolicited result code and was automatically rejected. The format of the parameters <PDP_type> and <PDP_addr> are found in command +CGDCONT. (NOTE 6: This event is not applicable for EPS.)

+CGEV: NW REACT <PDP_type>, <PDP_addr>, [<cid>]

The network has requested a context reactivation. The <cid> that was used to reactivate the context is provided if known to the MT. The format of the parameters <PDP_type>, <PDP_addr> and <cid> are found in command +CGDCONT. (NOTE 7: This event is not applicable for EPS.)

Among the defined events listed above, the present inventor has improved upon +CGEV: ME PDN ACT <cid> that is described in item 3) above, which is related to PDP context activation.

According to the technical solution, this +CGEV event (+CGEV: ME PDN ACT <cid>) is extended (or enhanced) to include a reason code, and to optionally include a MT allocated <cid_other>, for the case that only a single address is returned but the requested PDP type is IPv4v6. The MT allocated <cid_other> is included to signal that MT is capable of activating the 2nd context of another address type and has already activated it. It is omitted if the network supports only one type of address, or MT does not support the activation of the 2nd context without TE commands.

If such extension or enhancement is not made, and the network supports single address bearer only, the MT may wait for the request from TE to establish the 2nd address bearer. However, the request may never be made by TE because TE interprets the result as the network not supporting the other address type. This may also result in a race condition that TE requests the 2nd address bearer without knowing MT is doing the same, resulting duplicate requests to the network.

If such extension or enhancement is not made, and the network supports only one IP version, the TE may interpret the result as the network supporting single address bearer only and requests MT to establish PDN connection/PDP context of another address type not supported by the network.

Such extension of the particular +CGEV event (i.e. +CGEV: ME PDN ACT <cid>) can be described as follows:

+CGEV: ME PDN ACT <cid>[,<reason>[,<cid_other>]]

The mobile termination has activated a context. The context represents a PDN connection in LTE or a Primary PDP context in GSM/UMTS. The <cid> for this context is provided to the TE. This event is sent either in result of explicit context activation request (+CGACT), or in result of implicit context activation request associated to attach request (+CGATT=1). The format of the parameters <cid>, <cid_other> are found in command +CGDCONT.

The <reason> integer type parameter indicates the reason why the context activation request for PDP type IPv4v6 was not granted. This parameter is only included if the requested PDP type associated with <cid> is IPv4v6, and the PDP type assigned by the network for <cid> is either IPv4 or IPv6.

0 IPv4 only allowed.
1 IPv6 only allowed.
2 single address bearers only allowed.
3 single address bearers only allowed and MT initiated context activation for a second address type bearer was not successful.

The <cid_other> indicates the context identifier allocated by MT for an MT initiated context of a second address type. MT shall only include this parameter if <reason> parameter indicates single address bearers only allowed, and MT supports MT initiated context activation of a second address type without additional commands from TE, and MT has activated the PDN connection or PDP context associated with <cid_other>.

(NOTE 1A: For legacy TEs supporting MT initiated context activation without TE requests, there is also a subsequent event +CGEV: ME PDN ACT <cid_other> returned to TE.)

Meanwhile, to specify the <cid> parameter, the so-called "Define PDP Context (+CGDCONT)" should also be explained in terms of its description and defined values:

Description

The set command specifies PDP context parameter values for a PDP context identified by the (local) context identification parameter, <cid>. The number of PDP contexts that may be in a defined state at the same time is given by the range returned by the test command.

For EPS the PDN connection and its associated EPS default bearer is identified herewith. For EPS the <PDP_addr> parameter value shall be omitted.

A special form of the set command, +CGDCONT=<cid> causes the values for context number <cid> to become undefined.

The read command returns the current settings for each defined context.

The test command returns values supported as a compound value. If the MT supports several PDP types, <PDP_type>, the parameter value ranges for each <PDP_type> are returned on a separate line.

Defined Values

<cid>: a numeric parameter which specifies a particular PDP context definition. The parameter is local to the TE-MT interface and is used in other PDP context-related commands. The range of permitted values (minimum value=1) is returned by the test form of the command.

NOTE 1: The <cid>s for network-initiated PDP contexts will have values outside the ranges indicated for the <cid> in the test form of the commands +CGDCONT and +CGDSCONT.

To sum up, the various inventive concepts and features of the present disclosure can be described in the following manner.

A method of packet domain event reporting performed by MT and comprises the steps of: performing context activation for a dual-stack bearer; and receiving, from the network, information indicating that activation of the dual-stack bearer is not possible. The information includes certain reason codes: If the network indicates that it supports IPv4 only, then MT shall return this event to the TE with reason code 0 (but without cid); if the network indicates that it supports IPv6 only, then MT shall return this event to the TE with reason code 1 (but without cid); if the network indicates that it supports single address bearers only, bearer should be requested one-by-one ($1^{st}$ bearer already received, so should only request the $2^{nd}$ bearer); if MT does not support request the 2nd bearer without a command from TE, then MT return this event to the TE with reason code 2 (but without cid); if the network indicates that it supports single address bearers only, bearer should be requested one-by-one (1st bearer already received, so should only request the 2nd bearer); if MT can autonomously request the 2nd bearer without a command from TE, then MT does not (immediately) return this event to the TE with reason code 2 (but waits until the result of the $2^{nd}$ bearer comes back from the network)=in this case, it will say reason code 2 with cid_other ($2^{nd}$ request is successful); if the network indicates that it supports single address bearers only, and MT supports requesting the $2^{nd}$ bearer without a command from TE, MT goes ahead with the request (without telling TE anything), and the result of this $2^{nd}$ request failed, MT tells TE that this is the final result (reason code 3) and need not allocate a cid_other.

Figure 6:
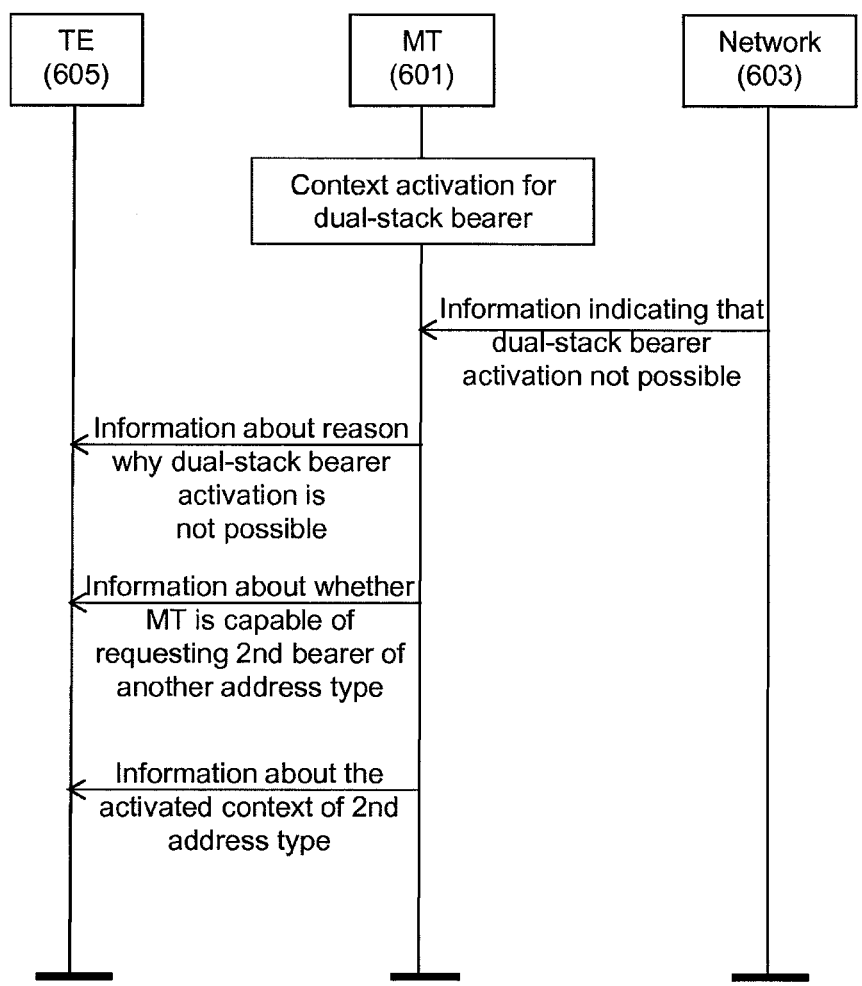
FIG. 6 shows an exemplary signal flow and procedures between a handset and network that can implement the embodiments.

FIG. 6 shows an exemplary signal flow and procedures between a handset and network that can implement the embodiments described herein.

The various embodiments described herein provide a method of packet domain event reporting comprising: performing, by a mobile termination (MT) device, context activation for a dual-stack bearer to be established with a network; receiving, by the MT device from the network, information indicating that the context activation of the dual-stack bearer is not possible between the network and the MT device; and sending, by the MT device to a terminal equipment (TE), information about a reason as to why the context activation of the dual-stack bearer is not possible between the network and the MT to thus achieve packet domain event reporting.

The method further comprises: sending, by the MT device to a terminal equipment (TE), information about a reason as to context activation of the dual-stack bearer is not possible due to only single address bearers allowed, and the context activation of the bearer of a 2nd address type was not successful, to thus achieve packet domain event reporting. The method further comprises: sending, by the MT device to the TE, information indicating that the MT device supports MT initiated context activation of a second address type, and the success of the context activation of the 2nd address type, by providing the context identifier of the activated 2nd context, The MT returns the context identifier of the 2nd context activation if three conditions are satisfied. A first condition of the three conditions is that the reason indicates that only single address bearers are allowed. A second condition of the three conditions is that the MT device supports MT initiated context activation of the second address type without commands from the TE. A third condition of the three conditions is that the MT device has activated a PDN connection or a PDP context of the second address type as a result of context activation. The reason indicates that (1) only IPv4 is allowed, or (2) only IPv6 is allowed, or (3) only single address bearers are allowed, or (4) only single address bearers are allowed and that MT initiated context activation for a second address type bearer was not successful. The step of sending informing about the reason of only single address bearers allowed, and the absence of the context identifier of the second address bearer, results in that the TE need not wait and see how it should act because MT does not support the context activation of the 2nd address type without a request from the TE, and the TE can immediately initiate the request of the 2nd address bearer to MT.

Figure 7:
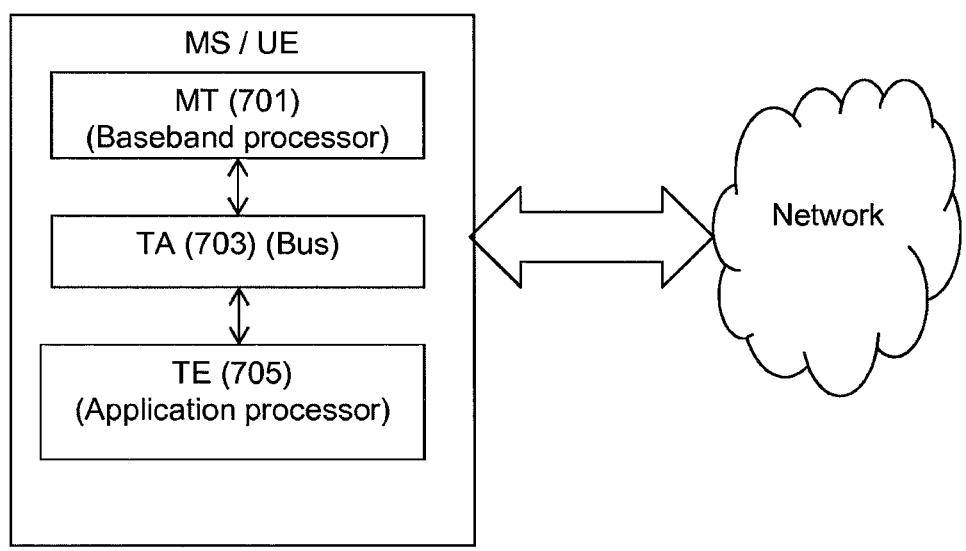
FIG. 7 shows an apparatus having a Mobile Termination (MT) that offers functions related to communication with a network, a Terminal Equipment (TE) that offers services to a user of the apparatus, and a Terminal Adaptor (TA) that allows communication between the MT and the TE using Attention (AT) commands.

Also, with reference to FIG. 7, the present disclosure also provides an apparatus (e.g., device having appropriate hardware components such as a processing unit, controller, CPU, microprocessor(s), memory or storage, etc. that access and execute corresponding software code) that is able to implement and carry out the above-described method.

The mobile station (MS) comprises all user equipment and software needed for communication with a mobile network. The mobile station refers to global system connected to the mobile network, i.e. mobile phone or mobile computer connected using a mobile broadband adapter. This is the terminology of 2G systems like GSM. In the 3G systems, mobile station (MS) is now referred as user equipment (UE).

In GSM, the mobile station consists of four main components:

Mobile Termination (MT)—offers common functions of a such as: radio Transmission and handover, speech encoding and decoding, Error detection and correction, signalling and access to the SIM. The IMEI code is attached to the MT. It is equivalent to the network termination of an ISDN access.

Terminal Equipment (TE)—is any device connected to the MS offering services to the user. It does not contain any functions specific to GSM.

Terminal adapter (TA)—Provides access to the MT as if it was an ISDN network termination with extended capabilities. Communication between the TE and MT over the TA takes place using AT commands.

Subscriber Identity Module (SIM)—is a removable subscriber identification token storing the IMSI a unique key shared with the mobile network operator and other data.

In a mobile phone, the MT, TA and TE are enclosed in the same case. However, the MT and TE functions are often performed by distinct processors. The application processor serves as a TE, while the baseband processor serves as a MT, communication between both takes place over a bus using AT commands, which serves as a TA.

The various embodiments described herein provide an apparatus comprising: a Mobile Termination (MT) that offers functions related to communication with a network; a Terminal Equipment (TE) that offers services to a user of the apparatus; and a Terminal Adaptor (TA) that allows communication between the MT and the TE using Attention (AT) commands, wherein a packet domain event reporting command (+CGEREP) is one type of AT command that enables or disables sending of result codes from the MT to the TE in case certain events occur in the MT for a packet domain or in the network, wherein one type of event is a Packet Data Protocol (PDP) context or PDN connection activation, for which the MT sends to the TE a result code that includes an integer type parameter to indicate the reason why a context activation request with PDP type IPv4v6 was not granted.

The MT has activated a context with a first single address type, which represents a PDN connection in LTE or a PDP context in GSM/UMTS, and the MT provides a<cid> parameter for said context to the TE. The context activation request is a result of an explicit context activation request (+CGACT) or a result of an implicit context activation request +CGATT=1). The integer type parameter is included if the network assigned PDP type is either IPv4 or IPv6, although the context activation request with PP type IPv4v6 was made. The integer type parameter is set=0 to indicate IPv4 only allowed, set=1 to indicate IPv6 only allowed, set=2 to indicate single address bearers only allowed, and set=3 to indicate single address bearers only allowed and MT initiated context activation for a second address type bearer was not successful. The result code further includes: an additional parameter <cid_other> that indicates the context identifier allocated by MT for an MT initiated context of a second address type. The MT includes said additional parameter if the reason in said integer type parameter indicates single address bearers only allowed, and the MT supports said MT initiated context activation of the second address type without additional commands from the TE, and the MT has activated the PDN connection or the PDP context of the 2nd address type associated with the parameter <cid_other>. The apparatus further comprises: an application processor that serves as the TE, a baseband processor that serves as the MT, and a connection bus that serves as the TA to connect the application processor with the baseband processor.

The various features and concepts described herein may be implemented in software, hardware, or a combination thereof. For example, a computer program (that is executed by a processor, controller, CPU, etc. in a computer, a mobile terminal and/or a network device) that implements a method and apparatus for improved PDP context activation and/or PDN connection activation may be comprised of one or more program code sections or modules for performing various tasks. Similarly, a software tool (that is executed by a processor, controller, CPU, etc. in a computer, a mobile terminal and/or a network device) for such method and apparatus may comprise program code sections or modules that are executed by a processor (or other controller such as a CPU) for performing various tasks.

The method and apparatus described in the embodiments herein are compatible with various types of technologies and standards. The concepts described herein can be implemented for a variety of technical standards. Some examples are: the 3G (IMT-2000) standard, which includes those in the 3GPP family [e.g., UMTS (UTRAN), WCDMA-FDD, WCDMA-TDD, UTRA-TDD LCR (TD-SCDMA)], and those in the 3GPP2 family [e.g., CDMA2000 1×EV-DO Release 0]; the 3G transitional standard (3.5G, 3.75G, 3.9G), which includes those in the 3GPP family [e.g., HSPA, HSPA+, LTE (E-UTRA)], those in the 3GPP2 family [e.g., CDMA2000 1×EV-DO Revision A (TIA/EIA/IS-856-A), EV-DO Revision B (TIA/EIA/IS-856-B), DO Advanced] and those in the IEEE family [e.g., Mobile WiMAX (IEEE 802.16e-2005), Flash-OFDM, IEEE802.20]; the 4G (IMT-Advanced) standard, which includes those in the 3GPP family [e.g., LTE Advanced (E-UTRA)] and those in the IEEE family [e.g., WiMAX-Advanced (IEEE 802.16m)]; and the so-called 5G or other future standards being developed. However, it can be understood that the above exemplary standards are not intended to be limited, as other related standards and technologies would also be applicable to the various features and concepts described herein.

The features and concepts herein are applicable to and can be implemented in various types of user devices (e.g., mobile terminals, handsets, wireless communication devices, etc.) and/or network devices, entities, components, etc. that can be configured to support improved IP addressing for IPv4, IPv6 or both.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

What is claimed is:

1. A method of performing a packet domain event report by a mobile termination (MT) of a user equipment (UE) to a terminal equipment (TE) of the UE, the method comprising:

receiving, by the MT from the TE, a context activation request for a first packet data protocol (PDP) type;

attempting, by the MT, a context activation with the first PDP type;

receiving, by the MT from a network, a second PDP type assigned by the network for the context activation instead of the first PDP type; and sending, by the MT to the TE, an event message including a reason parameter indicating why the context activation request for the first PDP type is not granted, wherein the event message further includes a second context identifier allocated by the MT for an MT initiated context of a second address type, and wherein the second context identifier is only included when the reason parameter indicates 'single address bearers only allowed', the MT supports an MT initiated context activation of the second address type without an additional command from the TE and the MT has activated a context associated with the second context identifier.

2. The method according to claim 1, wherein the reason parameter is only included when the first PDP type is IPv4v6 which is a dual-stack internet protocol (IP) and the second PDP type is either IPv4 or IPv6.

3. The method according to claim 1, wherein attempting the context activation comprises sending, by the MT to the network, a request for activation of a context with the first PDP type.

4. The method according to claim 1, wherein the reason parameter is set to one of a first integer indicating 'IP4 only allowed', a second integer indicating 'IPv6 only allowed', a third integer indicating 'single address bearers only allowed', and a fourth integer indicating 'single address bearers only allowed and MT initiated context activation for a second address type bearer was not successful'.

5. The method according to claim 1, wherein the event message further includes a first context identifier associated with the first PDP type.

6. The method according to claim 1, further comprising:
returning, by the MT to the TE, a subsequent event message for a legacy TE supporting an MT initiated context activation without a TE request,
wherein the subsequent event message includes a second context identifier allocated by the MT for an MT initiated context of a second address type.

7. The method according to claim 6, wherein the subsequent event message includes no first context identifier associated with the first PDP type and no reason parameter.

8. The method according to claim 1, wherein the context represents a packet data network (PDN) connection or a PDP context.

9. A user equipment comprising:
a terminal equipment (TE) configured to provide services other than communication services with a network; and
a mobile termination (MT) configured to provide the communication services with the network, the MT further configured to:
receive, by the MT from the TE, a context activation request for a first packet data protocol (PDP) type,
attempt, by the MT, a context activation with the first PDP type,
receive, by the MT from a network, a second PDP type assigned by the network for the context activation instead of the first PDP type, and
send, by the MT to the TE, an event message including a reason parameter indicating why the context activation request for the first PDP type is not granted,
wherein the event message further includes a second context identifier allocated by the MT for an MT initiated context of a second address type, and
wherein the second context identifier is only included when the reason parameter indicates 'single address bearers only allowed', the MT supports an MT initiated context activation of the second address type without an additional command from the TE and the MT has activated a context associated with the second context identifier.

10. The user equipment according to claim 9, wherein the MT is configured to only include the reason parameter when the first PDP type is IPv4v6 which is a dual-stack internet protocol (IP) and the second PDP type is either IPv4 or IPv6.

11. The user equipment according to claim 9, wherein the MT is configured to attempt the context activation by sending a request for activation of a context with the first PDP type to the network.

12. The user equipment according to claim 9, wherein the reason parameter is set to one of a first integer indicating 'IP4 only allowed', a second integer indicating 'IPv6 only allowed', a third integer indicating 'single address bearers only allowed', and a fourth integer indicating 'single address bearers only allowed and MT initiated context activation for a second address type bearer was not successful'.

13. The user equipment according to claim 9, wherein the event message further includes a first context identifier associated with the first PDP type.

14. The user equipment according to claim 9, wherein the MT is further configured to:
return, to the TE, a subsequent event message for a legacy TE supporting an MT initiated context activation without a TE request,
wherein the subsequent event message includes a second context identifier allocated by the MT for an MT initiated context of a second address type.

15. The user equipment according to claim 14, wherein the subsequent event message includes no first context identifier associated with the first PDP type and no reason parameter.

16. The user equipment according to claim 9, wherein the context represents a packet data network (PDN) connection or a PDP context.

* * * * *